Nov. 26, 1968 J. T. KRAUSE ETAL 3,413,187

GLASS BONDING MEDIUM FOR ULTRASONIC DEVICES

Filed March 31, 1966

INVENTORS J. T. KRAUSE
W. R. NORTHOVER
BY
ATTORNEY

United States Patent Office 3,413,187
Patented Nov. 26, 1968

3,413,187
GLASS BONDING MEDIUM FOR ULTRASONIC DEVICES

John T. Krause, New Providence, and William R. Northover, Westfield, N.J., assignors to Bell Telephone Laboratories, Incorporated, New York, N.Y., a corporation of New York
Filed Mar. 31, 1966, Ser. No. 539,011
1 Claim. (Cl. 161—192)

This invention relates to bonding materials. Specifically it is directed to glass adhesives for ultrasonic devices. The bonding materials within the scope of the invention are arsenic-sulfur-selenium glasses.

Ultrasonic elements such as transducers are fixed to delay lines or similar media by a variety of bonding materials. For relatively low frequency devices, low-melting solder is commonly used. Indium bonds are typical also. At high frequencies the impedance mismatch between the bonding material and the ultrasonic medium becomes limiting, giving rise to efforts to reduce acoustic losses by minimizing the bond thickness. Extremely thin bonds are obtainable with epoxy type adhesives but the impedance mismatch between typical epoxy cements and commonly used ultrasonic materials such as quartz or silica is particularly large. Furthermore epoxy resins are influenced by moisture thus adding the necessity of encapsulating the device.

Certain of these difficulties are overcome using the arsenic-sulfur-selenium glasses of this invention for bonding ultrasonic elements together. The arsenic-sulfur-selenium glasses have mechanical impedance values which more nearly match those of the common acoustic media and are rigid and stable. Since there is a significant discrepancy in the thermal expansion coefficients between the glass and typical ultrasonic materials (though the coefficients are comparable to those of the commonly used low-melting solders and indium), it might be expected that differential thermal contraction would be a problem during manufacture of devices using glass bonds. However, the glass bonds do not fail upon cooling from the softening temperature to room temperature since the glass is initially flexible, allowing strains which develop to be relieved.

These and other aspects of the invention will perhaps be more fully appreciated from a consideration of the following detailed description. In the drawing.

Figure 1:
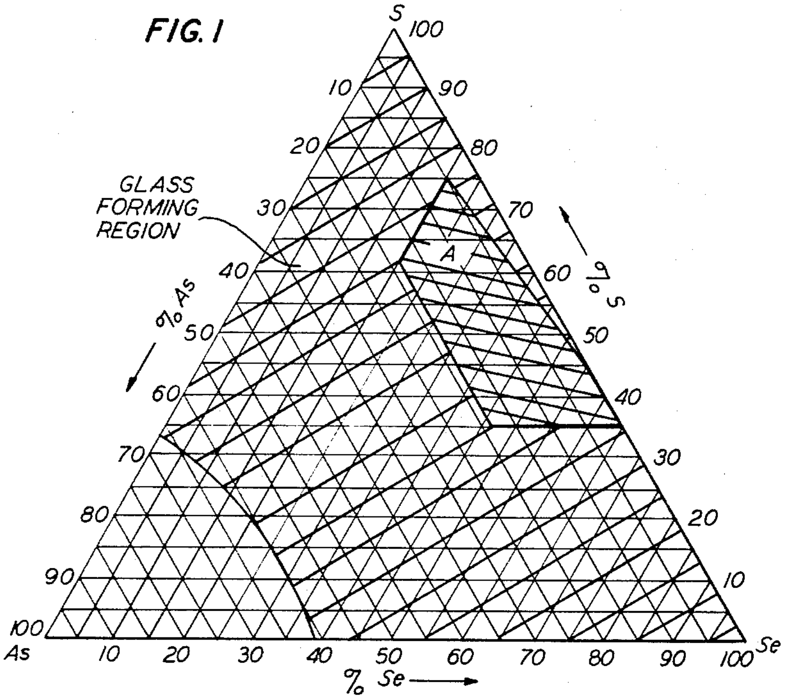
FIG. 1 is a ternary phase diagram showing the glass-forming composition for the system arsenic-sulfur-selenium.

The composition which forms glasses in the ternary system arsenic-sulfur-selenium are shown by the diagram of FIG. 1. The shaded area indicates a composition which provides a stable glass phase. Aside from the particularly attractive ultrasonic characteristics of glasses in this system another important property is the ability of these glasses in their liquid state to wet the ordinary ultrasonic materials and metals such as aluminum and gold which are commonly used as thin film electrodes in delay line fabrication. While it may be possible to find other glass compositions suitable for bonding ultrasonic media, most of the known low-melting glasses do not effectively wet such materials and conseqnuently are not particularly suitable as adhesives. Glasses within this system flow freely at approximately 150° C. so that extreme heat or compression is not necessary in fabrication.

The compositions of arsenic-sulfur-selenium glasses suitable for the purposes of this invention are shown in the shaded area A of the ternary phase diagram of FIG. 1.

The percentages are weight percent. These compositions wet the usual ultrasonic materials such as quartz, fused silica and the zero temperature coefficient glasses as well as metal films such as gold and aluminum and form adherent and stable bonds.

Figure 2:
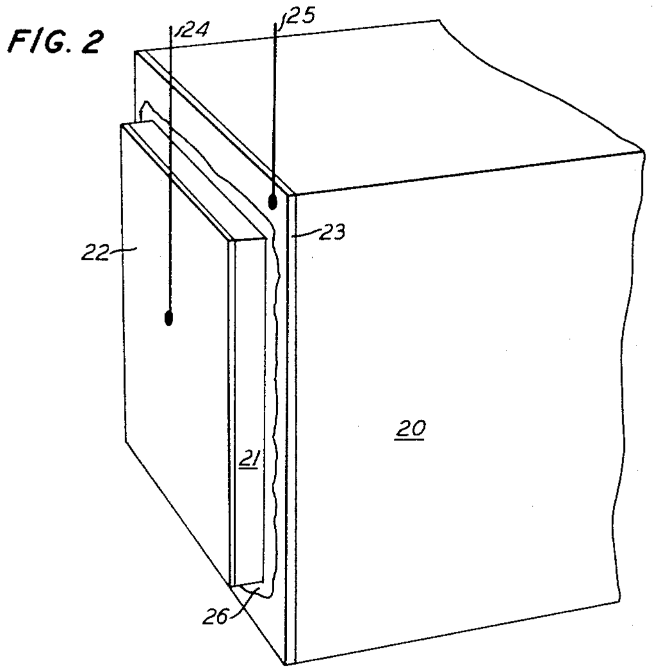
FIG. 2 is a perspective view of an ultrasonic delay line, an appropriate device to which the bonding materials of this invention may be applied.

Expressed in a different manner the glass compositions within the scope of the invention lie within a region of the ternary phase diagram for arsenic-sulfur-selenium which is bounded by lines joining the following points in sequence:

35% sulfur, 65% selenium
35% sulfur, 47% selenium, 18% arsenic
62% sulfur, 20% selenium, 18% arsenic
75% sulfur, 20% selenium, 5% arsenic
45% sulfur, 55% selenium FIG. 2 shows a typical ultrasonic delay line adapted to utilize the adhesive glass of this invention. The ultrasonic transmission medium 20 is the element in which the ultrasonic wave is propagated and which provides the delay. This material is typically fused silica, quartz or a lead-silica glass. The electric signal is impressed across the piezoelectric transducer 21 via conductive films 22 and 23 and electrical leads 24 and 25. The transducer 21 is affixed to the delay medium 20 with an arsenic-sulfur-selenium glass 26 having a composition within the area A of FIG. 1. In this arrangement the actual bonds occur between the piezoelectric material of the transducer 21 and the metal film electrode 23 so that the importance of effective wetting of both materials by the glass becomes evident. Alternatively, the metal film 23 may be applied to the transducer in which case the bond occurs between the metal film and the delay medium. A similar transducer, (not shown) is affixed to the other end of the delay medium. The glass bond is made by simply heating the glass to approximately 150° C. at which the glass flows freely, coating the transducer and the delay medium with the glass, and pressing the two elements together. The glass behaves much as conventional adhesives such as epoxy.

The glass adhesives when used in ultrasonic devices provide unexpected and outstanding advantages over substances commonly used for this purpose.

Various properties of glass bonds made in accordance with this invention were measured with specific attention given to properties of interest for ultrasonic applications. Some of these are recorded in Table I:

TABLE I

| Glass composition | Velocity, cm./sec.×$10^5$ | Density, gm./cc., 25° C. | Impedance, gm./cm.$^2$ sec×$10^5$ |
|---|---|---|---|
| 5As-60S-35Se | 0.90 | 2.581 | 2.32 |
| 8As-40S-52Se | 0.93 | 2.901 | 2.69 |

These properties compare favorably with those of conventional bonding materials. The bonds have been temperature cycled from 25° C. to −60° C. without any noticeable adverse effects. Acoustic measurements remained the same after this thermal treatment and over aging periods of several months.

Glasses used according to this invention provide electrically insulating bonds which is a convenient property for some applications. Although this invention is particularly adapted for ultrasonic delay lines it is also useful for bonding elements together for other ultrasonic devices. For instance the ultrasonic devices described and claimed in United States Patent 3,173,100, issued to D. L. White on Mar. 9, 1965, could utilize the bonding glasses of this invention for attaching transducers to the ultrasonic medium.

What is claimed is:

1. An ultrasonic device comprising a solid electrode metal film adhesively bonded to a member selected from the group consisting of quartz, fused silica and a lead-silica glass, said adhesive comprising a glass having a composition lying within a region of the ternary phase diagram for arsenic-sulfur-selenium which is bounded by lines joining the following points in sequence:

35% sulfur, 65% selenium
35% sulfur, 47% selenium, 18% arsenic
62% sulfur, 20% selenium, 18% arsenic
75% sulfur, 20% selenium, 5% arsenic
45% sulfur, 55% selenium.

References Cited

UNITED STATES PATENTS

| | | | |
|---|---|---|---|
| 3,173,100 | 3/1965 | White | 333—72 |
| 3,241,986 | 3/1966 | Jerger | 106—47 |

ROBERT F. BURNETT, *Primary Examiner.*

W. J. VAN BALEN, *Assistant Examiner.*